Jan. 29, 1957 D. WERTMAN ET AL 2,779,246
HYDRAULIC RAMMER CONTROL AND DRIVE SYSTEM
Filed June 28, 1954 12 Sheets-Sheet 3

INVENTORS
FRANK WARLICK
DAVID WERTMAN

BY
ATTORNEYS

Jan. 29, 1957  D. WERTMAN ET AL  2,779,246
HYDRAULIC RAMMER CONTROL AND DRIVE SYSTEM
Filed June 28, 1954  12 Sheets-Sheet 4

INVENTOR
FRANK WARLICK
DAVID WERTMAN

BY

ATTORNEYS

INVENTORS
FRANK WARLICK
DAVID WERTMAN

Jan. 29, 1957   D. WERTMAN ET AL   2,779,246
HYDRAULIC RAMMER CONTROL AND DRIVE SYSTEM
Filed June 28, 1954   12 Sheets-Sheet 9

INVENTORS
FRANK WARLICK
DAVID WERTMAN
ATTORNEYS

Jan. 29, 1957     D. WERTMAN ET AL     2,779,246
HYDRAULIC RAMMER CONTROL AND DRIVE SYSTEM
Filed June 28, 1954     12 Sheets-Sheet 10

INVENTORS
FRANK WARLICK
DAVID WERTMAN
ATTORNEYS

INVENTORS
FRANK WARLICK
DAVID WERTMAN

Jan. 29, 1957 D. WERTMAN ET AL 2,779,246
HYDRAULIC RAMMER CONTROL AND DRIVE SYSTEM
Filed June 28, 1954 12 Sheets-Sheet 12

INVENTORS
FRANK WARLICK
DAVID WERTMAN

BY

ATTORNEYS

United States Patent Office 2,779,246
Patented Jan. 29, 1957

2,779,246

HYDRAULIC RAMMER CONTROL AND DRIVE SYSTEM

David Wertman, Kensington, Md., and Frank Warlick, Washington, D. C.

Application June 28, 1954, Serial No. 439,939

5 Claims. (Cl. 89—47)

(Granted under Title 35, U. S. Code (1952), sec. 266)

The invention described herein may be manufactured and used by or for the Government of the United States of America for governmental purposes without the payment of any royalties thereon or therefor.

This invention pertains to a naval type turret gun and more specifically to a new and novel hydraulic drive, and control equipment for the ramming of ammunition increments into the gun breech for firing thereof. It relates to the novel structure and arrangement of parts whereby the projectile increment and the powder case increment, as transferred respectively from their separate loading positions laterally of the gun slide into mutually aligned relationship are simultaneously rammed from a position rearwardly of the gun breech to the firing position therein. The action of the control and drive equipment is fully automatic in operation, thus enabling rapid handling of ammunition prior to the firing of the projectile and more rapid operation of the automatic gun assemblies associated therewith than that of large bore guns heretofore or now in general use. It also facilitates the handling of ammunition in large bore guns of the generally semi-automatic type at a more rapid rate than with the projectile and bag charge ramming methods used with prior guns of this type and of similar size.

The mechanical and structural details of the automatic ramming unit are well adapted for use with a rapid fire gun and slide assembly of a type as shown in the copending application to Phillips H. Girouard et al., Serial No. 153,262, filed March 31, 1950. Additionally the instant rammer drive unit is adapted for incorporation in a gun and slide hydraulic system for a major caliber rapid fire gun and slide hydraulic system as shown, for example in the copending application to David Wertman, Serial No. 502,536, filed April 19, 1955.

The subject matter of this invention is partially shown and described in each of the aforementioned applications. However, the specific details of the drive unit are not claimed in either of these copending applications.

In prior art naval turrets mounting large bore guns the incorporation of a bag type powder charge for the propulsion of the projectile from the gun has placed certain limitations on the structure and arrangement of the gun and slide and the operative mechanism therefor. The use of this type powder charge in prior major caliber guns has placed limitations on the space arrangement behind the gun breech. The reason being the necessity for manual swabbing of the gun bore after firing to remove residual burned powder fragments from the powder charge. The rammer unit of the instant invention is adapted for incorporation with semi-fixed ammunition handling systems as advantageously accomplished in the gun system of Girouard et al., and is such as to permit empty case extraction and disposal facilities through an intermediate transfer position rearwardly of the gun then to a position external thereto. The incorporated novel arrangement of the J shaped rammer is such as to provide simultaneous powder case and projectile ramming without interference to the correlated gun handling operations of the systems associated therewith. The present invention as incorporated in the instant gun system permits powder case and projectile ramming from a position rearwardly of the gun breech wherein the increments to be rammed are positioned in axial mutually aligned relationship by their respective transfer trays of the gun ammunition handling assemblies.

The instant rammer is not limited as to usage to gun slide assemblies having provisions for empty case disposal. It may be used to advantage in systems in which automatic empty case disposal is absent. However, the arrangement thereof wherein the rammer is of a J chain type and in which it is provided with rotary drive, is such as to advantageously facilitate mounting thereof in a system incorporating these additional features.

The incorporation of semi-fixed ammunition as handled by these structural ammunition handling embodiments with this type of turret makes provision for the reception of two load increments namely the projectile and powder case at positions respectively on each side of the gun slide assembly. The ammunition increments thus received are loaded in the transfer trays of the gun loading system and thereafter transferred to a firing tray ramming position rearwardly of the gun barrel. The transfer trays when so aligned present guide surfaces which contribute to and maintain linearity of the ram chain. The rammer drive unit is advantageously electro-hydraulically controlled whereby ramming takes place immediately following transfer movement of the load increments into axial mutually aligned relationship. This control is accomplished by an interlock switch device of the gun electrical system which is rendered active as the trays reach the aligned position in the slide. It controls operation of a solenoid actuated pilot valve of the rammer drive unit to initiate ramming action thereby. The ramming action applied to the powder case simultaneously moves the powder case and projectile from the axially aligned position rearwardly of the gun breech to a firing position in the gun barrel with a single drive stroke of the chain rammer.

The hydraulic system with which this invention is concerned is adapted to provide power drive rotary motion to the chain sprocket for translation into linear chain travel and additionally provide actuation control for such transfer movement, in predetermined phase relationship to control the operation cycle as to creep speed, acceleration phase, and a constant velocity phase in a predetermined order and to provide retractive power and return control over the rammer chain for ram retraction following the ramming stroke thereof.

The power drive instrumentalities are normally semi-automatic in their operation and when so operated are hydraulically actuated. As hereinbefore stated suitable interlocks are provided in the instant system to insure the proper sequence of operation and to prevent improper firing of the gun. It includes interlock switches arranged in the path of rammer travel and actuated by suitable actuators provided on the chain for controlled acceleration and reversal of the rammer motor with reception of of the ammunition load in the gun breech. The inclusion of mechanical interlocks in the mechanical-hydraulic system makes it substantially automatic in that it requires only the operation of a rammer control circuit switch either to place the system in operation or to suspend operation as may be desired. The rammer drive unit of the instant invention is advantageously adapted for mounting on the gun slide and for actuation by an accumulator type hydraulic pressure system.

The arrangement of the rammer drive unit, the accumulator and other associated hydraulic assemblies on a gun slide proper permits movement of all these assemblies with the gun in its movement about the trunnion axis thereof. Ramming action may thus take place with the gun at any elevated position. It is thus apparent that the mechanical system for ammunition handling accompanied by the function of ramming to gun loading, with which this invention is intended to be used permits continuous gun loading and firing without the necessity to move the gun back to a loading cycle position of conventional large bore gun systems. The present invention according to a preferred embodiment thereof is well adapted for use with a large bore gun such for example, as an 8 inch rapid fire turret type unit. A gun having a rapid rate mechanical handling system, including hoisting and cradle transfer assemblies of a type adapted to load the transfer trays of the gun slide system at any angle of elevation or depression, in which the transfer trays are adapted to position the semi-fixed ammunition increments in an aligned position rearwardly of the gun breech, when combined with the improved electrically controlled, hydraulic control-and-actuation system for a rammer, of this invention has been found to permit satisfactory high rate projectile firing at a more rapid rate than that heretofore obtainable in large bore guns.

In light of the foregoing, it is a feature of the present invention to provide controlled power actuation for ammunition ramming after gun handling and in guns of major caliber of a type which are movable in elevation and depression, in which the loading of a round of ammunition is followed by simultaneous ramming action of combined round increments, and the ramming and firing of which may be accompanied or followed subsequently thereto by gun actions of empty case disposal without interference from the gun rammer.

One object of the present invention lies in the provision of a fully automatic hydraulic control and power actuation system for gun ramming in a gun firing system in which many of the foregoing disadvantages of powder bag ammunition usage are obviated and which is adapted to perform satisfactorily, all of the essential functions of the rammer systems heretofore or now in general use and in which the possibility of apparatus malfunction or failure is reduced to a minimum.

It is a further object of this invention to provide a fully automatic hydraulic control system for mechanical actuation of a chain type gun rammer in which power actuation from a prime mover is provided at or in close adjacency to the point of the drive application for the rammer.

An additional object of this invention lies in the provision in a rapid fire gun actuating hydraulic and mechanical systems for use with gun mounts of a turret which are adapted to be electrically interlocked for hydraulic movement of the rammer chain in predetermined sequential relationship with the function of other gun handling system units of the turret gun and slide.

Another object of this invention resides in the attainment of new and improved automatic gun ramming control of both a projectile and powder charge without manual intervention and in time sequence relationship one with the other and wherein the possibility of personnel malfunction is reduced to zero.

An additional object of this invention lies in the provision of electrical control means in a hydraulic drive for a rammer system which provides initial creep actuation prior to ram head engagement with the ammunition and subsequent accelerated control thereover following ammunition pickup thereby, through a deceleration phase at the end-of-stroke travel, and over the mechanical functions of ram retraction to initiate breech-block closure after a predetermined return travel thereof.

Another object of the invention lies in the accomplishment by improved means of powder case ramming in aligned relationship with projectile ramming whereby the respective ammunition increments are transferred from a mutually aligned position in axial alignment with the gun breech to a position permitting firing thereof following closure of the gun breech and which ramming may be accomplished at any angle of gun elevation.

An additional object of the invention lies in the provision of an automatic hydraulic control and a drive system by means of an improved control-and-drive mechanism for the simultaneous ramming control and actuation which is well adapted for use with a mechanical ram system for semi-fixed ammunition and in which ramming energy is applied to a powder case for ramming thereof in coupled relationship with a projectile and from a position rearwardly of the gun breech to a firing position therein.

Another object of this invention lies in the provision in a rapid firing rate gun actuating system and mechanism therefore in the attainment of new and improved automatic ammunition ramming by a rapid rate rammer control and drive mechanism in which initial actuation and subsequent drive control is automatically correlated with a predetermined positional relationship of the ramming chain in the path of travel thereof.

A still further object of the present invention lies in the provision in a hydraulically actuated automatic rammer drive apparatus for mounting on a gun turret slide of the character stated, of the provision of suitable electrically controlled hydraulic interlock, devices to insure the proper sequence of operation between the instant rammer drive and the drive components of the hydraulic system of the gun slide of the type for which the invention is intended.

Another object of the present invention is to provide a hydraulically actuated automatic rammer drive system for use with apparatus of the character described which, by use of suitable electrical interlocks therein and electrical actuation devices provides the proper sequence of operation between the component parts thereof and correlated relationship with the operation of equipment operative in precedent and subsequent action, which control is variable to accommodate peak load conditions and in which operational interlock and control devices are provided for the control of units associated therewith in subsequent control relationship to the completion of ramming action for the ammunition at the gun breech.

Still another object of the invention lies in the application of electrical control over the hydraulic power apparatus of a new and novel rammer system for simultaneously ramming of semi-fixed ammunition increments into the gun breech and for subsequent rammer retraction.

An additional object of the invention lies in the provision in a rapid fire gun system of an automatic rammer incorporating hydraulic control and drive systems by means of which the simultaneous ramming of both the powder case and the projectile into the gun breech at any position of the gun in the path of travel thereof in elevation or depression is accomplished without return thereof to a loading station and coupled with the correlation of said apparatus with electrical interlock means for the activation and return of the ramming head thereof following the completion of the ramming stroke and in which retraction is accomplished without interference to contemporaneous or subsequent handling operations.

It is among other and still further objects of the present invention to provide novel hydraulic drive units for use in the automatic gun loading, and gun ramming apparatus of a turret; to provide a novel manual or semiautomatic hydraulic unit for operating the hydraulic control drive of the rammer and to control certain of the electrical and hydraulic interlocks associated therewith.

Other objects and many of the attendant advantages of this invention will be readily appreciated as the same becomes better understood by reference to the following detailed description when considered in connection with the accompanying drawings wherein.

Figure 1:
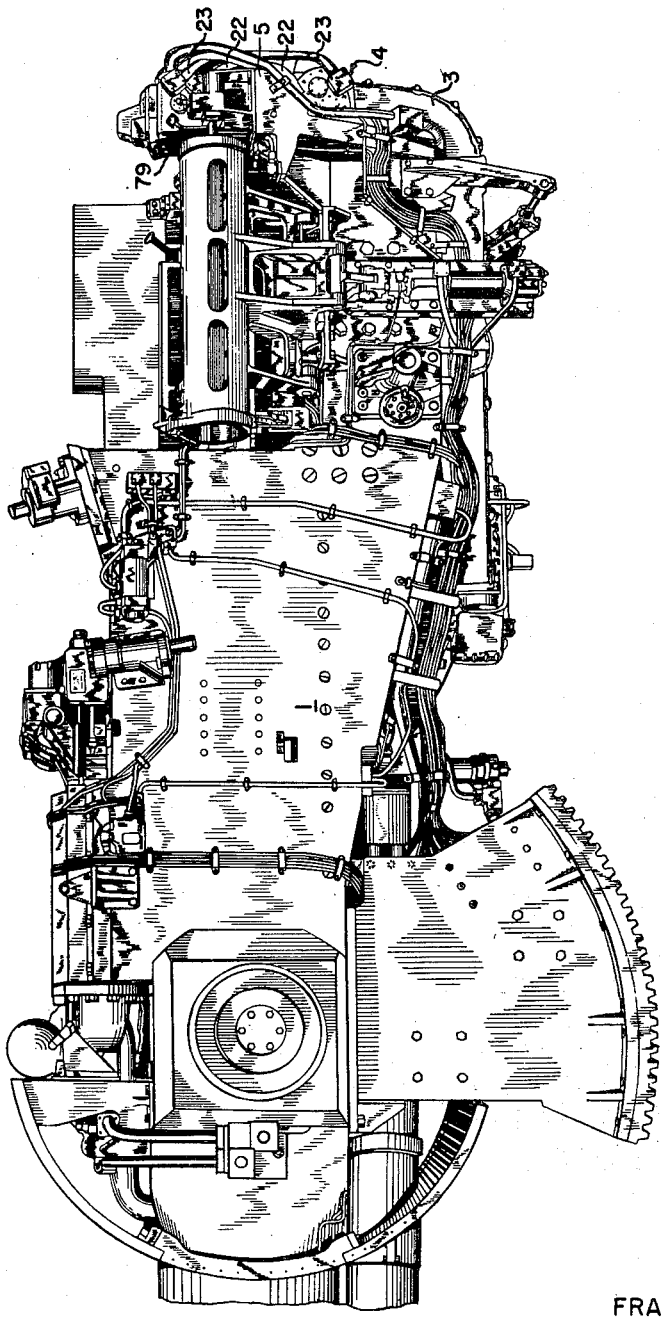
Fig. 1 is an elevational view of the gun slide with which the instant invention is adapted for usage, and showing the left hand side of a right-hand gun assembly.
Figure 2:
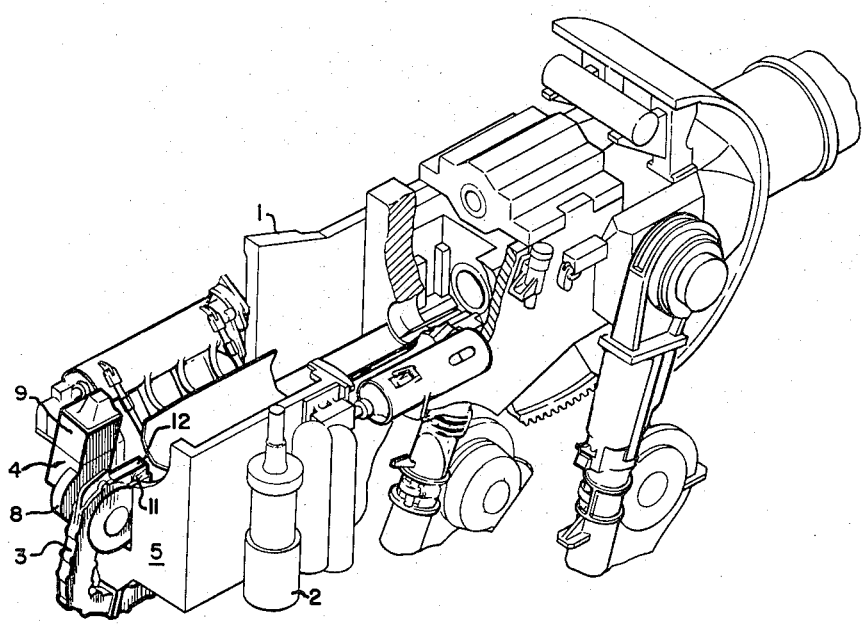
Fig. 2 is a rear view of the gun slide of Fig. 1.

Referring now to Figs. 1 and 2 of the drawing in which the assemblies of a right hand gun slide are shown from the left hand and rear sides thereof respectively in the assembled relationship thereof in the turret in Fig. 1 and in diagrammatic relation to the piping system in Fig. 2. The principal hydraulic system and mechanical system units are shown in their assembled positions on the gun slide 1, in Fig. 3, which assemblies include the accumulator unit 2 which is hydraulically coupled to a hydraulic pump fluid type source not shown and which functions to supply hydraulic fluids for the gun slide system. This assembly functions as the source of pressure for the operation of all of the hydraulic energy units of the entire slide system with the exception of the recoil-counterrecoil assemblies and receives fluid from the pump and storage tank facilities in the turret as described in greater detail in the copending application to Wertman supra. The showing of the rammer assembly 3, and the drive assemblies 4 therefor, in the arrangement of Figs. 1 and 2 is considered advantageous when the apparatus is desired to be mounted and used on a gun slide in correlated relationship with other gun and slide mechanisms. This usage is particularly significant when a case ejection system as shown in the Girouard et al. application, hereinabove cited, is used therewith, wherein the retracted position of the chain rammer is adjacent the ejection tube of the empty case ejection apparatus.

Figure 3:
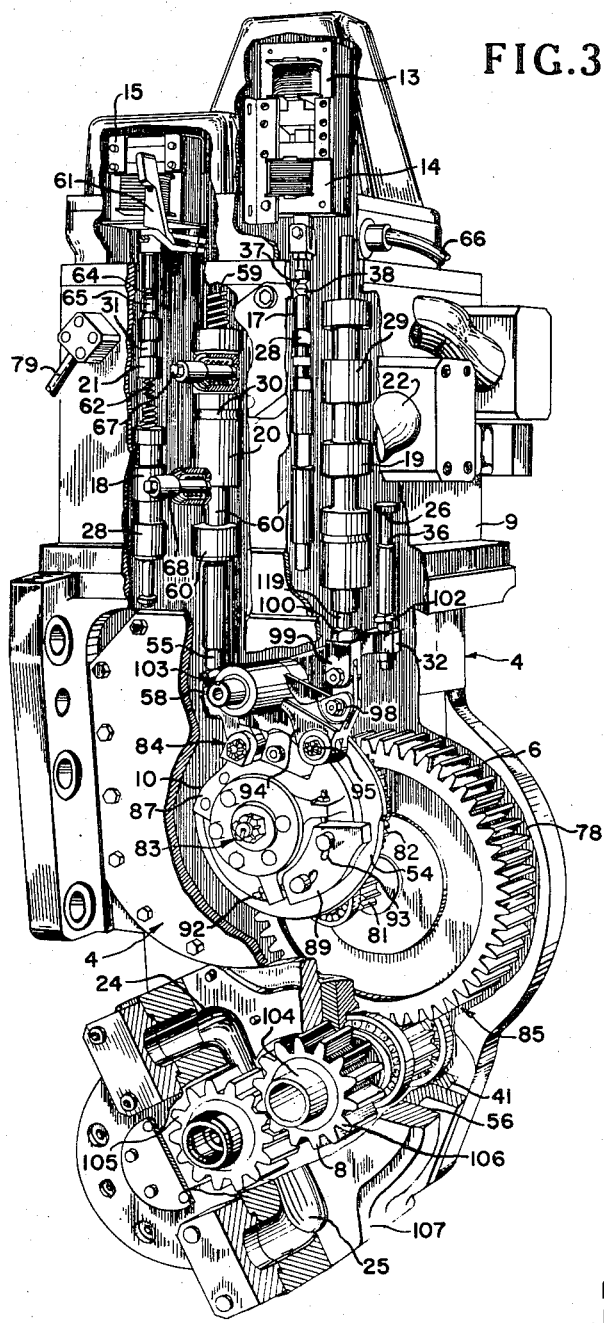
Fig. 3 is a phantom view with parts thereof partially in section showing the hydraulic valve control and drive arrangements of the power unit for the chain rammer.

The rammer drive unit operating equipment 4, shown in bold outline in Fig. 2, is mounted as a single subassembly on the rear plate 5 of the gun slide 1 by flange arrangements as shown generally in Fig. 3. This equipment has pipe connections with the accumulator 2, and the drain systems as shown in the piping general arrangement of Fig. 5 and has provisions for a direct drive coupling connection with the rammer chain sprocket gear 6 of the rammer sprocket 7. The rammer drive unit assembly 4 comprises a valve block 9, a timing mechanism 10 and a gear type hydraulic motor 8 as the three main elements thereof. The unitary assembly of these main elements forms an enclosed unit as shown in Figs. 2 and 3. It provides a shaft driving connection for the ram chain 11, type rammer which automatically runs the ram chain head 12 to a limit-stop position at the breech face, and reverses rotation thereof to withdraw the chain to the normal retracted position. The timing action of this assembly is controlled by electrical arrangements of the gun electrical control system and by the valve block 9 and timing mechanism 10 hereinafter described in greater detail.

The control arrangement for the rammer drive assembly 4 is such as to provide chain operation at a low rate creeping speed, for example, approximately three feet per second until the chain contacts the ammunition 120. It then accelerates the movement to a full ram speed of ten feet per second. The controls thereof additionally function to control retracting movement of the ram chain 11 to withdraw it from contact with the ammunition in the gun breech, at a greater rate of speed than that of the full forward ram speed.

Figure 4:
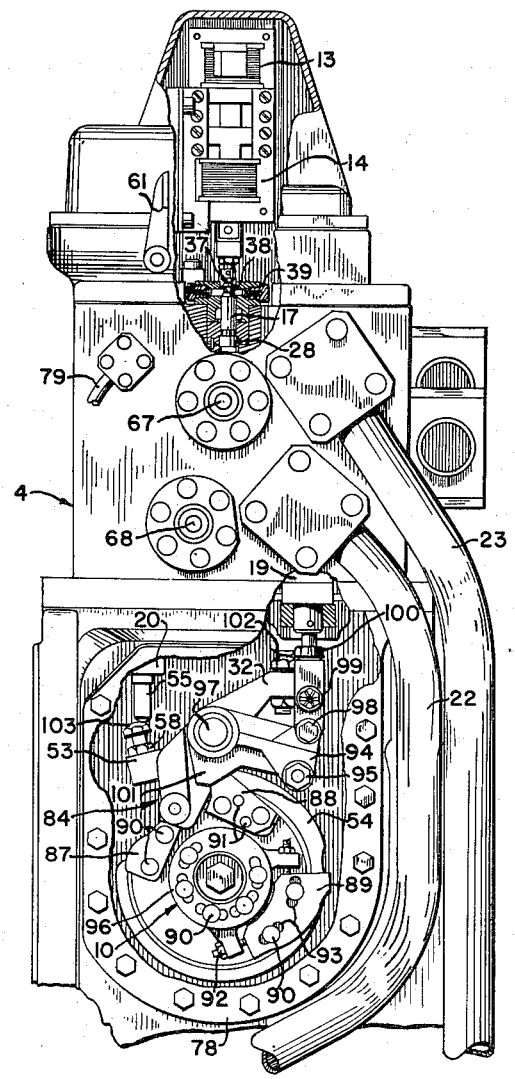
Fig. 4 is a fragmentary view in elevation with parts thereof broken away showing the cam and latch arrangements and solenoid control arrangements of the rammer drive control unit.

The valve block 9 of this assembly serves as an enclosed housing for the three solenoids 13, 14, 15, the six principal valves 16 to 21 inclusive and the supplementary hydraulic parts associated therewith as shown in Figs. 3 and 4. The six principal valves incorporate spool-type plungers 26 to 31 respectively with mechanical connections therefrom to the solenoids and timing mechanism elements. Two large external pipe lines 22 and 23 connect the hydraulic passages of the valve block with the fluid pressure inlet and exhaust ports 24 and 25 respectively, of the hydraulic motor 8, of Fig. 5.

The valve 16 of the valve block is a pressure-operated plunger arrangement which extends into the case of timing mechanism 10 for actuation of the lever arm 32 of the cam follower 33. It functions at the start of and during the ramming action of the operation cycle to unlatch the drive and to shift the valve 20. The valve chamber 34 is arranged to apply pressure simultaneously to both the reduced cross section 35 or rod side and to the upper end thereof. The downward movement of the plunger is accomplished as a result of the differential pressure area provided by the reduced cross section at the piston rod 36.

Pilot valve 17 is a two position, solenoid operated spool type valve, which is restrained in either of two detent positions 37 and 38 by the detent 39. The chamber 40 in which valve 17 is located extends through the block 9, and is adapted at the lower end thereof to provide a valve stop surface 42 for the end 43 of plunger 27. This valve stop is provided with a vent hole 44 which runs to the timing mechanism case. The upper end of the valve is coupled at 45 to the push-pull plunger 46 of the tandem arranged pair of solenoids 13 and 14. These solenoids are encased by cover 47 in isolated relationship with respect to the hydraulic system.

The solenoid 13 functions to raise valve 17 in a manner to port pressure to the directional valve 19 and thus initiate the ram stroke.

The solenoid 14 functions in a manner similar to that of solenoid 13, to depress valve 17 to control the retracting movement of the ram chain 11.

The blocking valve 18 is a spring-and-pressure operated spool type valve, the plunger 28 of which is arranged in a valve passage 48 of the block 9 at a position below the valve 21. The differential pressure-operated plunger 49 located therebeneath operates in conjunction therewith to hydraulically shift it against the action of spring 51 from the spring-operated or blocking position thereof. This shifting action is controlled by the pilot valve 17, whereby valve 18 moves upward as pressure is applied to the plunger 28 thereof at the initiation of ramming action. The shifting of valve 17 in this action is controlled by solenoid 13. The movement of the valve 18 in this action controls the unlatching of valve 16. In the other position thereof it blocks pressure from the valve 16 chamber 34 and opens this chamber to the tank line.

The action of the hydraulic motor 8 in accelerating, decelerating, stopping, and reversing the rammer drive mechanism in ramming and retraction action, is controlled by the position of the valve 19, which with valve 20 controls the speed of chain movement. This valve comprises a variable-position spool type element 30 arranged in chamber 50 to be shifted in each direction under hydraulic fluid action.

The function of throttling motor exhaust through the metering grooves 52 at critical periods of the cycle is accomplished by action of the mechanical cam 54. The valve is adjustably coupled to the rocker arm 53 of the cam follower 33 and is arranged with the lower end 55 of the plunger 30 extending into the timing-mechanism case. The plunger portion 57 at the upper end of the valve spool 30 receives hydraulic pressure in a manner to move the valve downward to start the ramming action as the solenoid 13 shifts valve 17. The valve is shifted upwardly by hydraulic pressure acting on the differential area thereof at the lower spool land. The action of this valve functions to reverse the drive direction. It is controlled by the shifting of pilots 17 and 21 when solenoids 14 and 15 are energized.

Figure 8:
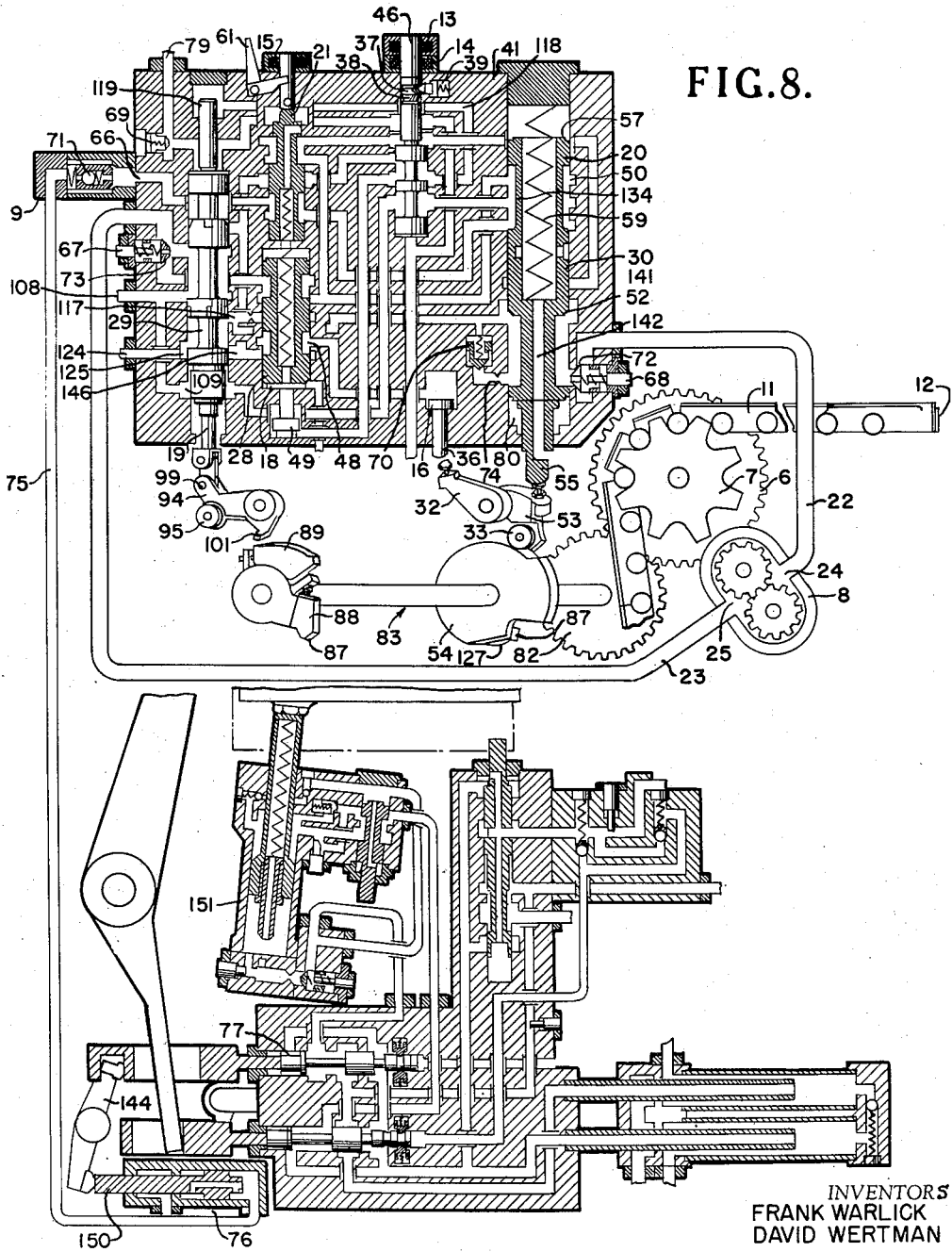

The valve 20 controls the critical action of porting accumulator pressure to valve 19 and to the hydraulic motor 18 for control of the functions of initial ramming, ram-creeping and ram-accelerating movement as well as speed deceleration and latch action at the end of the operation cycle. Further, it functions with other valves in a breech interlock and closing control action as shown in Fig. 8 and hereinafter described in greater detail with respect to the valve 21. The plunger 55 at the lower end of valve 20, which extends into the case of the timing-mechanism 10 is in contacting relationship with the cam follower rocker arm adjustment 58 when this valve is depressed against the arm 53 by loading applied by spring 59 at the top and by hydraulic pressure acting on the differential area thereof at the lower land 60. The valve is mechanically positioned at the upward position thereof by the action of valve 16, combined with the action of the timing cam mechanism 10.

Figure 14:
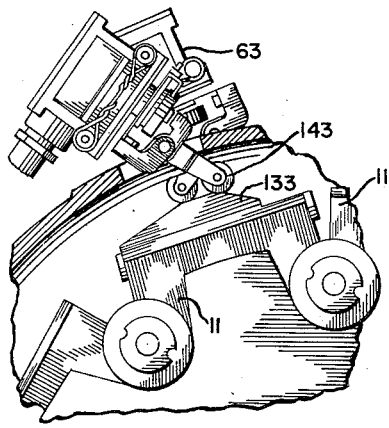
Fig. 14 is a fragmentary view similar to the showing of Fig. 13 showing the pawl arrangements for ram control at the end of the cycle.

The pilot and interlock actions are controlled by the valve 21 of the retraction-stroke control arrangement in which it is normally actuated by the gun control system. Alternative provisions are included for manual shifting by the manual operating lever 61. It functions to insure hydraulic interlock action in holding the retraction-control settings until the chain is retracted. This valve also functions in cooperation with valve 20 to control automatic closing of the breech. These functions are accomplished by an arrangement wherein valve 21 is spring-loaded by spring 62 at the bottom thereof and is operated downwardly upon energization of solenoid 15 at the end of the ram stroke. This energizing action is effected in correlation with the gun control circuitry including switch 63 of Fig. 14, which also energizes solenoids 14 to shift the valve 17 downwardly. The valve 21 is thereafter held down by hydraulic pressure applied at the differential area 64 of the upper land 65 thereof. In this position it ports pressure in a manner to hold valve 17, and open the port connection 66 to the breech closing valve operating cylinder 76 of Fig. 8. When valves 17 and 21 move in this manner they cause shifting of valve 19 to reverse the direction of the drive motor 8. The position of valve 20 at this time, in conjunction with the cam-control movement thereof, functions to delay porting of pressure for breech closing control until after the reverse travel movement of the rammer chain to a point whereby the chain head 12 clears the top of the breechblock.

The valve 21 is controlled manually by the lever device 61 which is located as shown in Fig. 3. This lever, when operated, accomplishes the same valve porting control functions as are accomplished in automatic action, whereby the breech closing is delayed during retraction of the chain until the breechway is clear for closing movement of the breechblock.

In addition to the hereinabove described principal valve elements of the valve block, the assembly additionally comprises five spring-loaded piston-type check valves 67 to 71 which are either attached or enclosed in the block and which are hereinafter described in greater detail.

The valve block assembly includes two adjustable spring check valves 67 and 68 which are located in the rear face of the block as shown in Fig. 3. These check valves are located respectively at each of the connection ports 23 and 22 for the motor 8. The lower check valve 68, Fig. 3, is a combination restriction and check which functions to control the maximum speed of the retracting movement by restricting the flow of exhaust fluid from the motor. This check lifts from the seat 72 therefore to permit unrestricted flow in the ramming-stroke portion of the movement cycle.

The second adjustable check valve 67 is of the same general design and arrangement as the above described adjustment 68. It is located at the other motor-port connection from line 23 to control the maximum speed of the ram chain in the forward or ramming movement thereof, by restricting exhaust flow from the motor. It lifts from the seat 73 thereof to permit unrestricted flow in the retracting portion of the cycle of movement.

Figure 5:
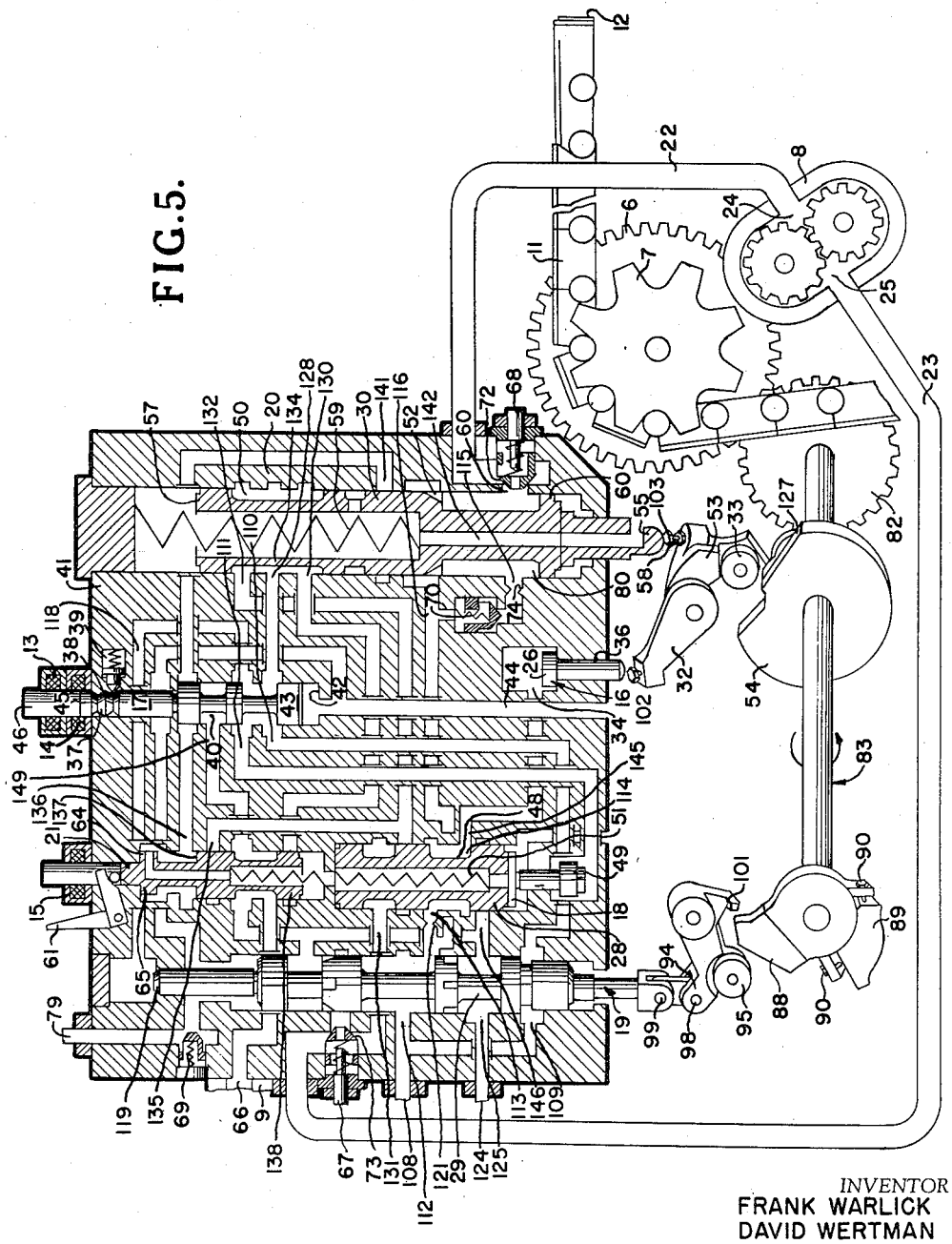
Figs. 5–10 are schematic diagrams of the hydraulic control arrangement of the rammer drive unit and show the operational arrangements of the various valve members thereof under several conditions of operation as hereinafter described in greater detail.

A conventional check valve arrangement 70 is located as shown in Fig. 5 at the restriction 74 at the bottom chamber port 80 of valve 20. This restriction 74 functions to decelerate the drive at the end of the retracting movement. The check valve 70 seats to oppose flow to the port 80 when the drive is starting in the opposite or reverse direction for ram stroke operation. It compells high pressure therein to throttle through the metering grooves 52 on valve 20 to provide creeping-control action.

The special type check valve and pressure regulating device 71, Fig. 8, is assembled in the outlet port 66 for line 75 which connects the valve block 9 to the breech closing valve cylinder 76. The cylinder assembly 76 as shown in Fig. 8 is not a part of the instant invention. However, it is shown for illustrative purposes to enable a better understanding of the cooperative relationship between the rammer drive unit and the breech hydraulic system. This latter system is more fully described in the copending application to Frank Warlick, Serial No. 439,938, filed June 28, 1954 and the operative relationship with other gun slide hydraulic devices is more fully set forth in the Wertman application, Serial No. 502,536 supra.

The valve 71 prevents possible faulty breech closing action due to any pressure surge in the line. It lifts under fluid action to permit unrestricted flow when valve 77 of the breech hydraulic system is actuated.

A conventional check valve 69 is located at the drain line outlet connection 79 to prevent pressure variations in the drain leads of the valve block. This valve opens to allow free passage of the accumulated seepage of the valve block 9 and closes to block external back pressure.

The drive gearing 6 and timing-mechanism 10 enclosed in the timing case 78 beneath the valve block, as shown in Fig. 3, comprises three shaft-mounted groups of parts assemblies. This includes the assembly 85 of a spur gear 81, and pinion 6 coupled thereto which drives the cam timing gear 82 of the cam shaft assemblage 83, and the cam follower rocker arm assembly 84 which includes the rocker arm unit 32. These elements provide a motor-driven gear train and valve-actuating; drive-latching mechanism for the maintenance of an exact positional relationship of the several valve elements with respect to the position of the rammer chain 11 in the travel movement thereof. This correlated relationship is provided by the assembled and adjusted details of the entire mechanism assembly which comprises as the three major units thereof, the drive gear and pinion, the cam shaft assembly 83 and the rocker arm and follower assembly 84. It is more readily understandable when consideration thereof is taken with respect to the hereinafter described element details.

The gear and pinion assembly 85 is an arrangement of conventional design wherein the elements comprise a 54 tooth spur gear 6 and a 12 tooth spur pinion 81. The assembly is ball bearing mounted at the bottom side of the timing case 78 with the 54 tooth spur gear 6 connected in driven relationship with the 14 tooth output spur pinion 41 of the hydraulic drive motor 8. The 12 tooth driven pinion 81 thereof is in driving engagement with the 44 tooth spur type timing gear 82 on the cam shaft assembly 83. The arrangement is therefore such as to provide a single rotation of the cam timing gear 82 for one complete stroke of the rammer drive chain. The 54 tooth driven gear 6 is preferably adapted at the hub thereof for connected reception of the rammer chain sprocket shaft 86 whereby demountable assembly is provided therewith.

The cam shaft assembly 83, Fig. 4, comprises the cam timing gear 82, the timer cam 54, and three cam segments hereinafter designated as the latching cam segment 87, valve 19 positioning cam segment 88 and ram decelerating cam segment 89. They are adjustably bolted to the timer cam by machine screws 90. The final adjusted positions of the cams 87 and 88 are secured by dowel pins 91 inserted after adjustment to fix the operative positions thereof. The adjustment of cam segment 89 is maintained by locked setscrews 92 after positioning of clamp screws 90 in the slots 93 therefore.

The timer cam 54 and the three cam segments provide the side-by-side circular cam contours on the positionally adjustable mounting hub 96 wherein segment contour 88 is aligned beneath the rocker arm 94 which is attached to valve 19, and the second contoured segment 89 is located beneath the cam follower 95. The arrangement is such that both cam units function to control the variable cam-actuated movement of valves 19 and 20 and additionally the latching function for the drive at the end of the retracting stroke.

The rocker arm and cam follower assembly 84 comprises the cam follower and the rocker arm which are adjacently mounted in independent free bearing relationship on the auxiliary shaft 97 as shown in Figs. 3 and 4.

The rocker arm 94 incorporates the cam-roller or follower 95 and the valve-link clevis elements at 98 and 99 thereon, the latter including adjustable screw details at 100 for setting the attached position of valve 19.

The cam follower assembly 84 comprises the three arms or lugs 32, 53 and 101, respectively for action of valve 16, valve 20 and the pivotally mounted latch 88. Each of the valve operating arms 32 and 53 are provided with adjustable lockscrew contact bearing lifters 102 and 103, respectively. The setting adjustments are provided to vary the engagement position of the respective valves associated therewith.

The hydraulic gear type motor for driving the gear train is a separately housed unit which is bolt and dowel mounted at the bottom of the timing gear case with the interior details and port arrangements as shown in Fig. 3. The motor is of the reversible gear type design comprising conventional drive gears 105 and a driven gear 106. The driven gear shaft 104 extends from the motor 8 through the motor housing 107 in ball bearing supported relationship at 56 into the bottom of the timing case 78 to engage the 14 tooth pinion 41 of the gear train in spline-coupled relationship. The end of the spline shaft being shown in Fig. 3. The pinion 10 of the shaft 104 is ball-bearing mounted in the gear case in a preferred embodiment of the invention rather than in the motor housing to facilitate a drive-output coupling feature wherein the motor is removable without disturbing the drive proper.

Operation

The operating cycle of the rammer drive unit consists of the ram stroke which forces the ammunition into the gun, the ram retracting stroke which immediately follows the ramming stroke, and the actuation of the operating cylinder 76 of Fig. 8 for the breech closing valve 77. This operating cylinder actuation advantageously occurs during the retracting stroke of the rammer.

The ram stroke is the first or initial phase of operation of the hydraulically driven chain rammer and initiation thereof occurs in correlated relationship with other gun slide functions in a preferred embodiment of the invention when the pair of ammunition transfer trays reach their respective mutually aligned ramming positions. As the transfer trays, Figs. 1 and 2, come to rest in the slide, switches of the electric circuit close to permit current flow through solenoid 13 on the rammer drive unit for energized positioning of pilot valve 17 with the additional closure of a ram control switch on the gun captain's control panel of the electrical control system.

The automatic control of the entire gun system is initiated and maintained active by this rammer control switch on the gun captain's control panel which is manually held in the ram position whenever fully automatic cyclic operation is desired since this switch provides the last of a series of manual switches which must be closed to satisfy all manual conditions of energization for automatic control. As this switch, not shown, of the electrical circuit for rammer drive unit 4 is closed, solenoid 13 lifts the pilot 17 to an upward position, as shown in Fig. 5 for positioned engagement at the lower detent position.

Figure 6:
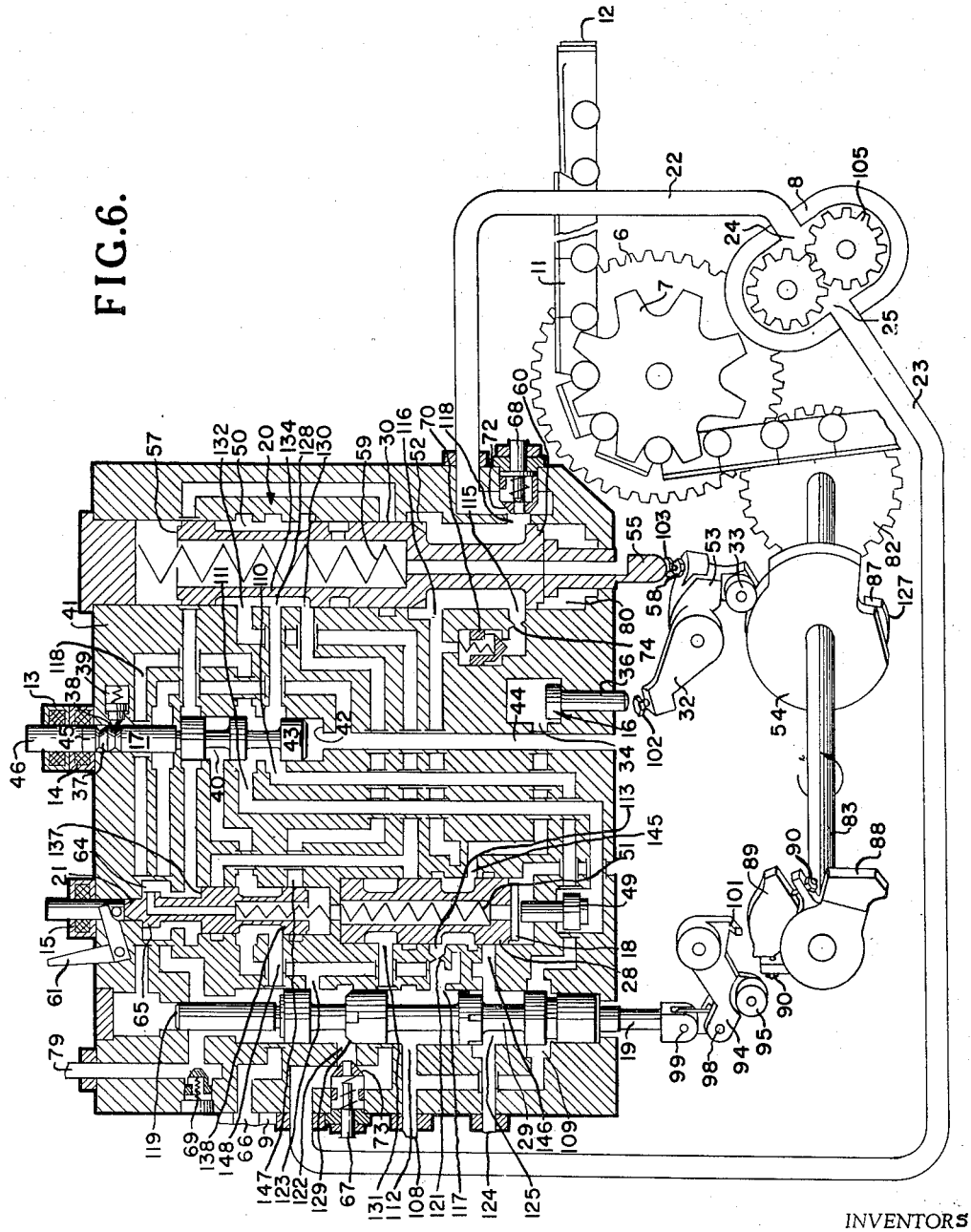

This action of valve 17 allows fluid from line 108 to flow across the lower port 109 of valve 19 to ports 110 and 111 of pilot valve 17. From the upper by-pass port 111 fluid is directed downwardly, as shown in Fig. 6, to the lower end of the actuating plunger 49 associated with the end of valve 18. Action of this plunger 49 shifts valve plunger 28 to an upward position. Simultaneously with by-pass flow at 111 through the downward path, fluid is directed across the ports 110 and 111 upwardly through the uppermost passage 118 of Fig. 6, across the valve block 9 to the top surface of the actuating plunger 119 associated with the upper end of valve 19 to cause it to shift all the way in a downward direction. Hydraulic pressure at all times acts on a differential area at the bottom of valve 19. The downward movement of valve 19 allows fluid entering from line 108 to move through this inlet port of valve 19 across the center spool portion of 29 and out through the intermediate port 112. Exit flow from port 112 passes through a speed control orifice 121 in the block to port 113 on valve 18. The fluid then flows directly around a lower porting portion 114 at 48 on valve 18, and out through a passage in the block to the end chamber 34 of the unlatching plunger 26, for valve 16, causing it to move downwardly to bear against the end of screw 102 at the end of arm 32.

This action lifts the rocker arm 53 and latch assembly at 33 to unlatch the rammer cam 54 and move the end 55 of valve 20 to an upward position. Movement of this valve opens the lower port 115 of valve 20 to port 116, thus allowing fluid at restriction 121 to flow directly from the outlet port 117 on valve 19 which is associated in adjacency with the restriction 121.

This flow from the outlet port 117 of the intermediate porting portion of valve 19 is through a path parallel to the speed control orifice 121 in a flow path to valve 20 and to the outlet port 118. Fluid flow from the outlet port 118 on valve 20 is directed past the check valve seat 72 and flow adjustment 68 to the ram side of the hydraulic motor 8 through line 22. This pressure fluid flow entering motor inlet port 24 actuates the motor 8 to rotate and move the head 12 of the rammer chain 11 toward the powder case engagement position thereof. The discharge from the motor is ported from 25 through line 23 and the adjustable restriction orifice of 67 to the upper port 122 of valve 19 to the outlet port 123 thereof and thence out to tank line 124 through the lower port 125 of valve 19.

Figure 11:
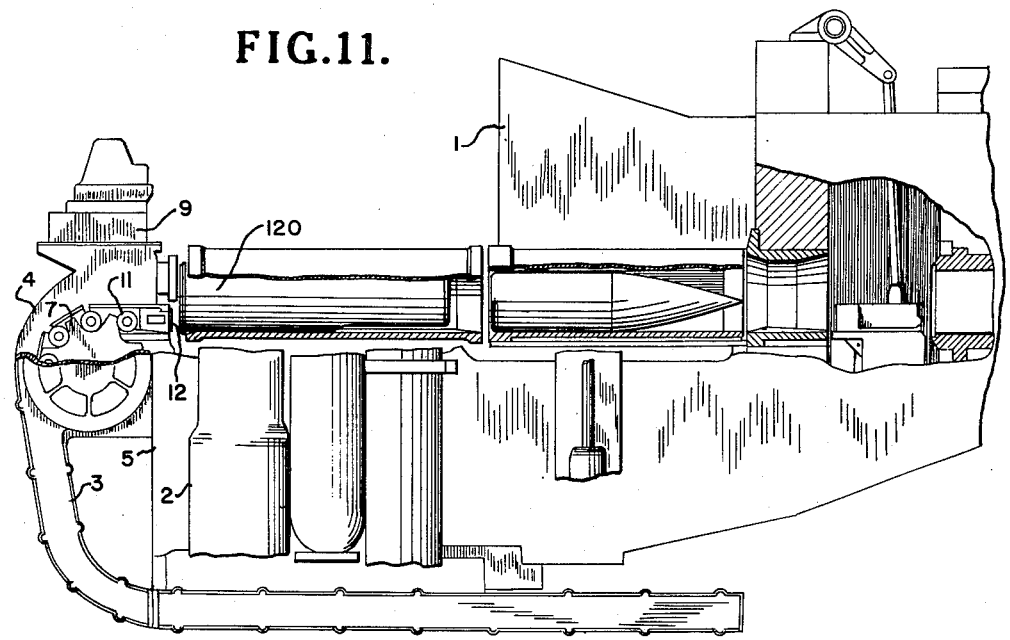
Fig. 11 is a view of the rammer chain at the initial position thereof.
Figure 12:
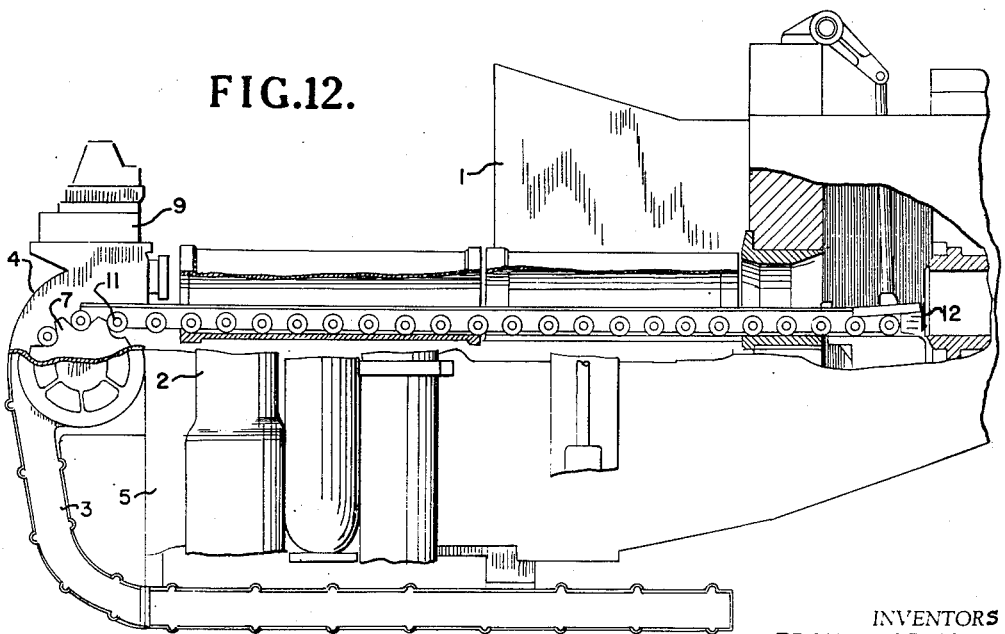
Fig. 12 is a view in vertical section showing the arrangement of the rammer drive at the end of the ramming stroke.

The initial driving action applied to the motor 8 as provided by this porting arrangement of fluid and as additionally controlled by the design of the timer cam is such as to provide a slow movement rate creep speed, as for example 3.3 feet per second, during the initial five inches of movement of the ram head which advances it to a contacting relationship position with the ammunition 120, Fig. 11. This action is effected by controlling the fluid flow by adjustment of the cross-sectional area of restrictor 72. This action is as shown in Fig. 6.

After the rammer chain has completed this initial travel, valve 20 is shifted to the fully open position through rocker arm lifting action by contact of the roller 33 with the cam segment 54. This lifting of valve spool 30 through cam action applied by screw 103 fully opens the passage between port 115 and the lower outlet port 118 of this valve, which is connected with the rammer drive motor 8. At the same time valve 19 is allowed to move down through rotation of the timer cam 89 associated therewith. This action as illustrated in Fig. 6 permits the rammer to accelerate to maximum speed under control of the adjustable speed control orifice at 67 in the motor outlet circuitry.

The rammer continues to move toward the full position thereof at this speed until it approaches the end of its ram stroke. Thereupon the rocker arm 94 attached at 98 to valve 19 forces the valve to move toward the neutral position thereof through contact with the deceleration cam segment 89. This action of the rocker arm against valve plunger 29 produces chain deceleration by throttling rammer motor flow discharge through the throttling grooves 129 in the spool of valve 19 between ports 123 and 122 in a manner to gradually restrict motor exhaust flow. During this decelerating action the chain continues to move through the transfer trays along guideways thereof toward the rammed ammunition position in the gun breech. As the rammer chain moves the head 12 thereof across the breechblock, the spool plunger 30, valve 20 is moved upwardly by the cam segment 127 of cam 54 to close off flow at the lowermost port 130 of the upper porting portion to port 131 by rocker arm movement of the valve spool 30. This port is blocked by movement of valve plunger spool 30 to a position shown in Fig. 7.

The breechblock which is controlled in rising action by breech closing cylinder 76 of Fig. 8, which is in turn controlled by the rammer valve block 9, is prevented from rising while the rammer chain is across its path. This positive prevention of breech closing cylinder action occurs as the chain reaches the end of its forward stroke. The switch actuation pawl 133 on the chain moves switch 63 of Figs. 13 and 14 which is in electrical interlock relationship with solenoid 15 of the system in a manner whereby it functions to actuate valve spool 27 for return stroke action of the rammer.

Figure 7:
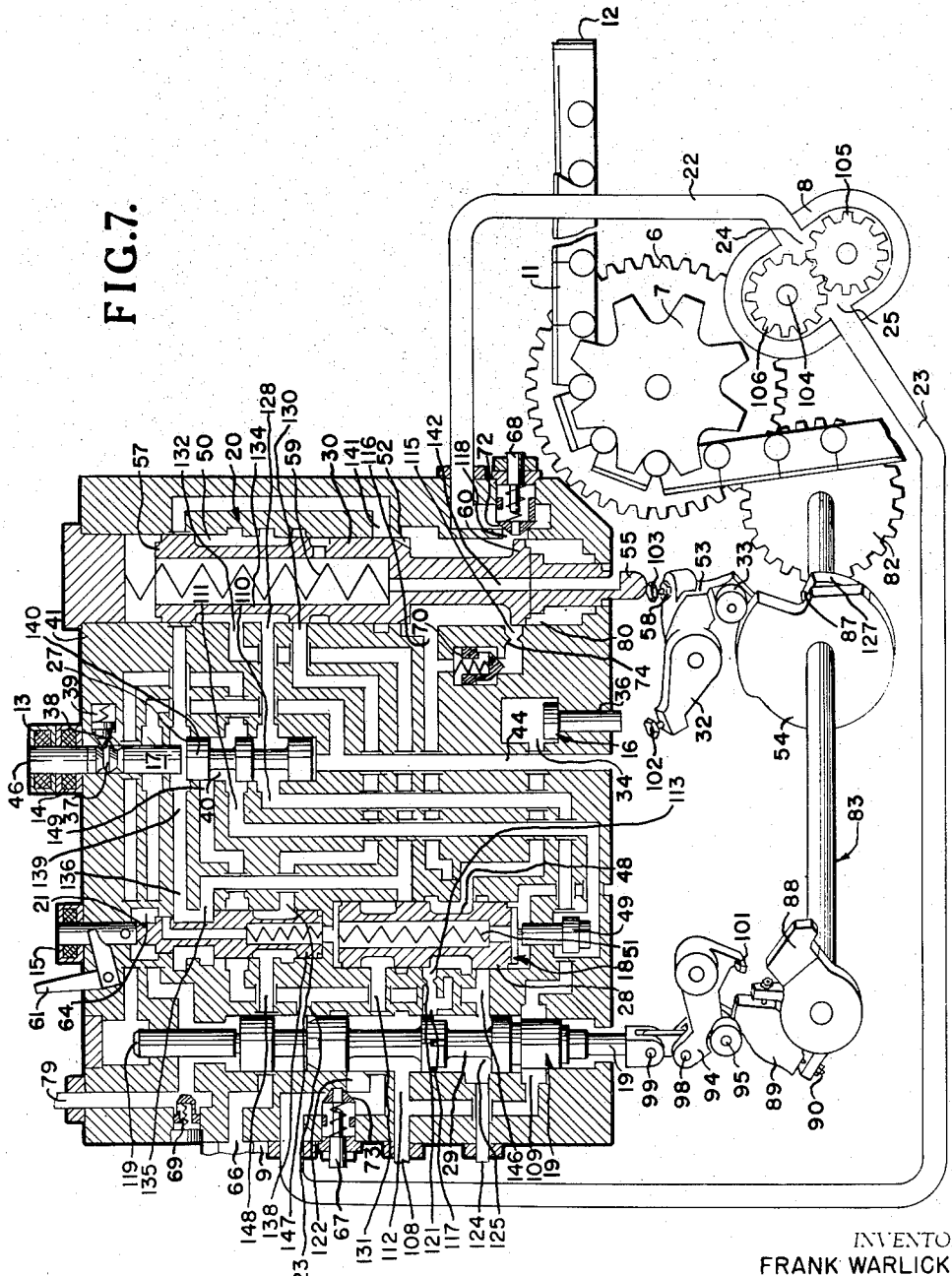

Immediately following the shifting of pilot valves 17 and 21, by their respective solenoids, from the positions of Fig. 6 to the respective positions shown in Fig. 7, an hydraulic interlock action takes place wherein both valves 17 and 21 are hydraulically blocked to prevent any tendency to shift in an upward direction. This interlock arrangement of these two pilot valves is provided as a precautionary measure to insure chain retraction and additionally, to prevent casualty, in the event of electrical control system failure of faulty switch action.

As the solenoid 15 moves valve 21 downwardly, oil under pressure from line 108 flows through the lowermost porting path at port 109 of valve 19 to the inlet valve port 110 of valve 17 across this port and thence to port 128 of valve 20. Fluid entering this port is directed through an adjacent porting portion 134 of valve spool 30 to port 132 shown immediately above the inlet thereto. One path of flow from this port on valve 20 is blocked by valve 18. A second path from this block provides for flow to an inlet port 135 on valve 21. This port is blocked as long as valve spool 28 is in its up position. With the valve 21 in a position to block this port, the upper porting section of the valve spool connects the port 136 immediately above the inlet in a manner to open it to the drain.

As the valve 21 moves downwardly under action of solenoid 15, this port 136 which previously had been connected to drain is closed off therefrom and connected to the inlet port 135 of this valve. A differential area at this porting portion of the spool of valve 21 as provided by the reduced diameter of the upper spool land 137 of 31 as compared to land 138 acts under applied fluid pressure to hold the valve in its down position. This hydraulic holding action is unaffected by any movement of the solenoid, such for example, as accidental electrical control action thereof.

The fluid under pressure is also ported therefrom as shown in Fig. 7 from port 136 of valve 21 directly across to port 139 of valve 17. Valve spool 27 when depressed by solenoid action, presents a differential area at the upper land portion 140 thereof which functions to hold valve spool 27 in its downward position. Pressure is also ported through this upper porting passage of valve 17 to a blocked port 141 of valve 20. The flow path through this port is blocked throughout the hereinafter described ram retracting stroke and until valve 20 reaches its lowest position at the end of the ram retraction. The action of valve 20 in which the spool 30 is spring biased against the lifter assembly is responsive to cam movement to open port 141 of this valve.

Simultaneously, with the completion of the ram retracting stroke this port 141 of valve 20 is vented to the tank to release the blocked pressures on the differential spool areas of plungers 27 and 31 and thus terminate the innerlock relationship. This cessation of the application of differential pressure to these valve spools by connection of the flow passage thereacross with the tank line opening at 142 in valve spool 30, terminates the valve holding action and permits valve 21 to shift upwardly under spring action.

Figure 13:
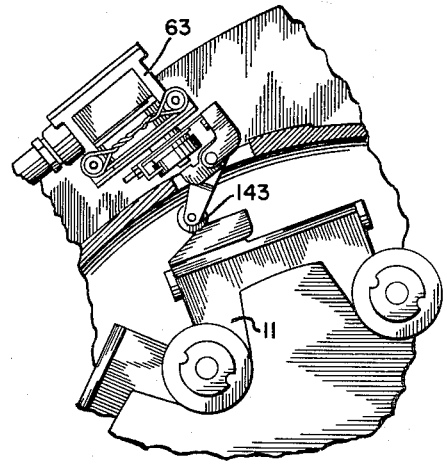
Fig. 13 is a fragmentary view showing the chain pawl and switch actuation arrangements for control of the drive unit.

The preceding actions take place after the completion of the ram stroke and are initiated when the tail link cam 133 of the chain 11, Fig. 13, engages the roller type cam follower-switch actuator 143 and closes the rammer drive electrical interlock switch 63.

This switch action causes the solenoid actuated downward shifting of the valves 21 and 17 and the subsequent initiation of valve action for the rammer retract-run.

Valves 18, 19 and 20 control the retracting stroke action wherein pressure on the valve actuating plungers as applied at the upper end of valve 19 and at the lower end of the valve 18 is released by movement of valve 17 to the down position of Fig. 8. Valve 19 is moved to its extreme up position by fluid pressure application to the differential pressure area 115 at port 118. Thereupon valve 18 moves under a spring load to the lowermost position thereof. This action ports fluid from valve 16 through ports 145 and 146 of valve 18 to the tank line port 125 of valve 19 to connection with 124. Valve 18 is thus free to be moved upward by the cam follower arm 32 when the end of the retracting stroke is reached. Valve 19, in the up position thereof, directs fluid from line 108 to the speed control adjustment 67, as shown in Fig. 8 and out port 122, past the check valve at this adjustment to the retract side of the motor. This causes the motor to rotate in a reverse direction to start the ram retracting stroke. Return flow from the motor is ported through the adjustable speed control orifice 68 at valve 20 through the lowermost porting section 118 thereof, thence through the ports 115 and 116 thereof and out port 125 on valve 19 to tank line 124. The rammer accelerates in the retracting action thereof until it reaches the maximum speed allowed by the adjustment of the speed control orifice 68.

As soon as the rammer chain head retracts to a position which is clear of the path of movement of the breechblock which is transverse with respect thereto, the contoured timer cam 54 allows valve 20 to move downward. This action of valve plunger 30, as shown in Fig. 8, allows fluid under pressure at port 128 to flow from this inlet port through the valve porting spool section 134 thereof to the outlet port 130 immediately therebelow and thence through the lower porting path across ports 147 and 148 of valve spool 31. From the port 148 on valve 21, fluid flows to an outlet port 66 of the valve block 9 and out through the pressure regulator 71 in line 75 to the forward chamber of the breech closing valve operating cylinder 76 in a manner as shown in Fig. 8. Action of the plunger 150 of this operating cylinder against the operating lever 144 shifts the upper valve of the breech operating valve block and results in porting fluid to the lower end of the breech operating cylinder 151.

Figure 9:
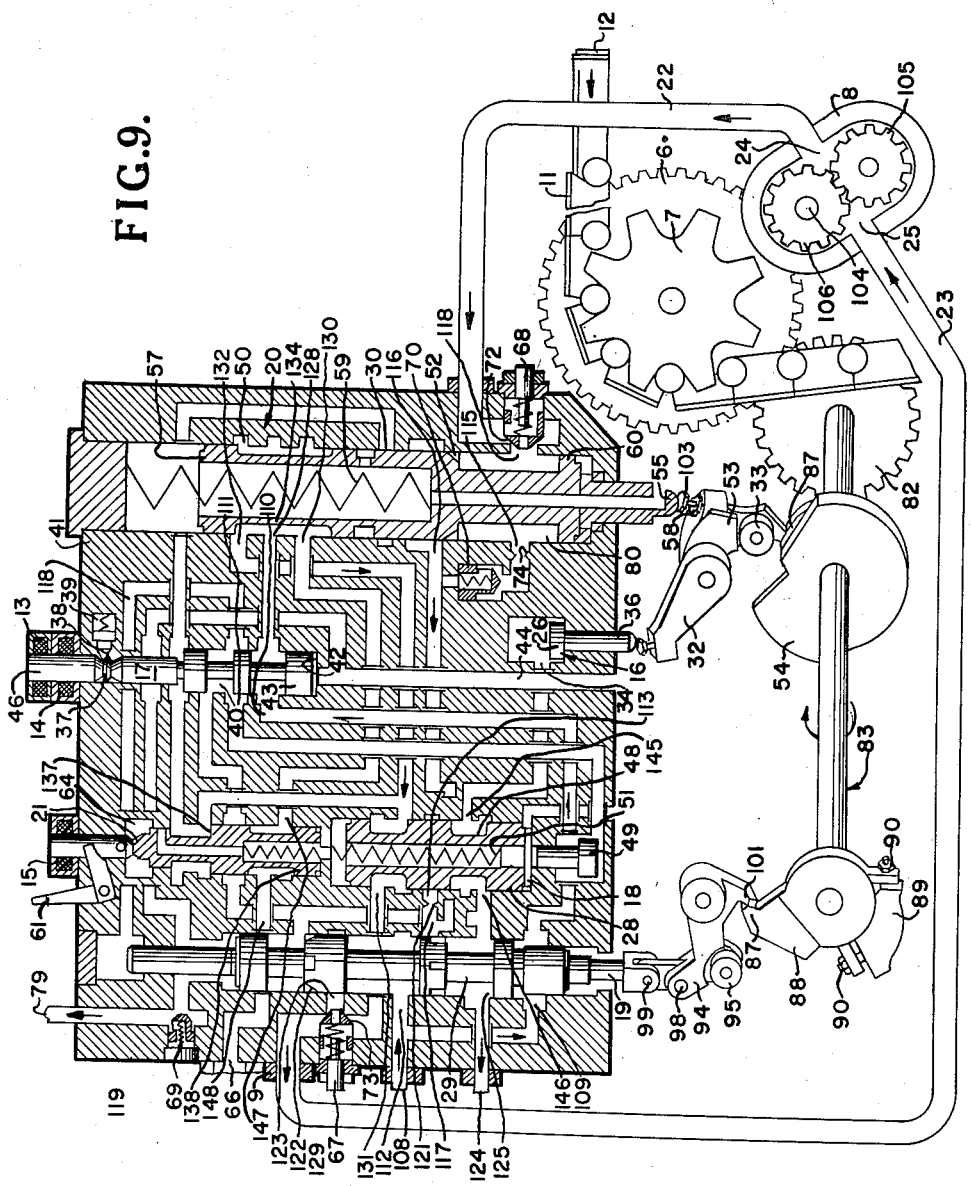
Figure 10:
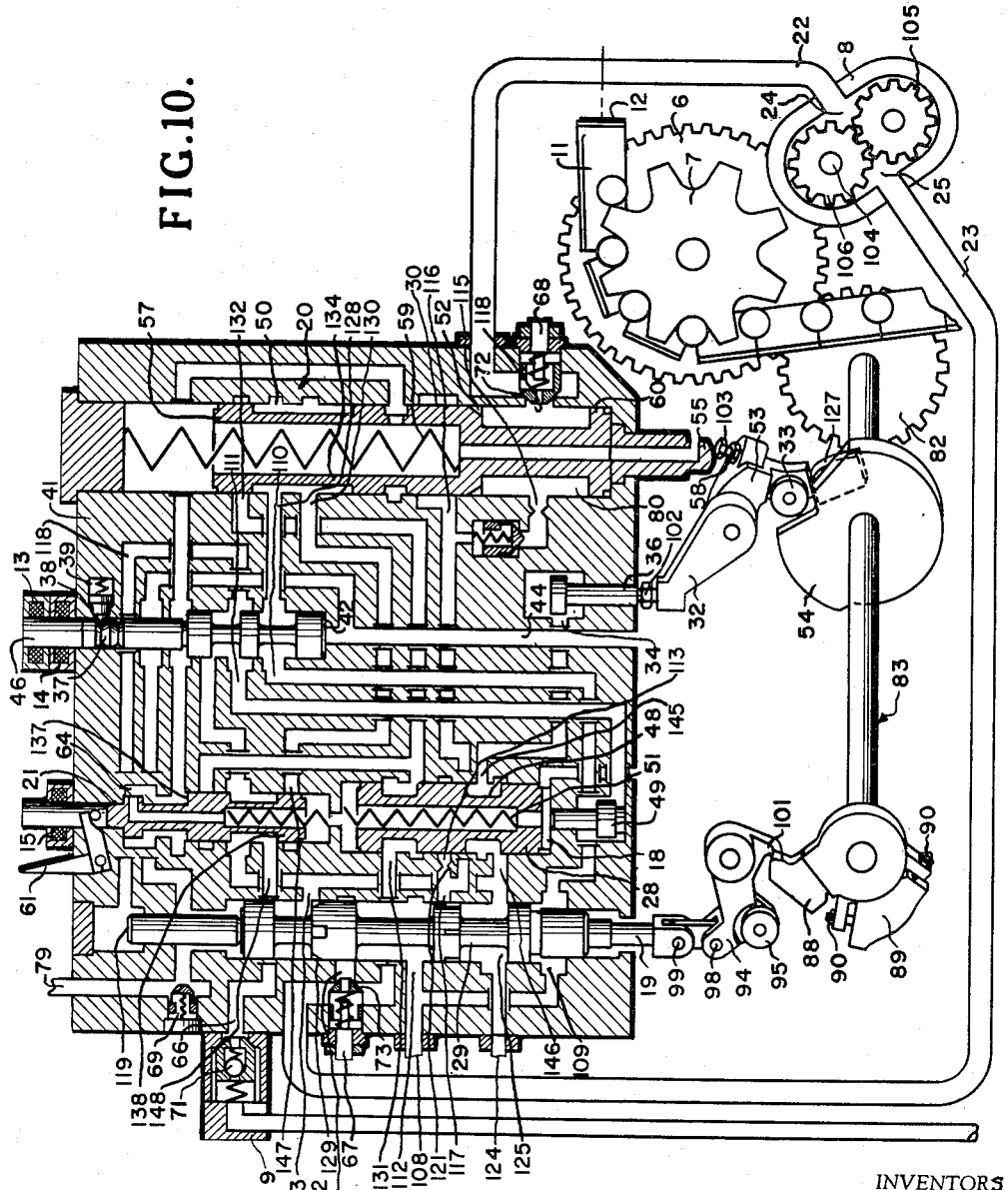

As the rammer chain approaches the end of the retraction stroke, the valve positioning cam segment 88 for valve 19 in the rammer drive unit acts on the latch 101 of rocker arm 94 associated therewith to pull valve spool 29 toward its center or neutral position. This action is as shown in Fig. 9. Discharge from the hydraulic motor which passes through the lower porting chamber 80 of valve 20, and across port 117 and port 125 in valve 19 to the outlet port for 124 in the previous action of Fig. 8 is substantially cut off when spool 29 is moved to the neutral position thereof. Fluid flow is then throttled in the intermediate port 117 of valve 19, wherein it is caused to pass through throttling grooves 129 in the valve spool land to provide deceleration of the rammer. Simultaneously therewith, the valve plunger 30 is acted upon by spring action of 59 to move it downwardly. Hydraulic pressure acts on the differential area thereof to aid in this action. This movement is limited by the sloping surface of the timer cam 54. Additionally, some decelerational action takes place at valve 20 as motor discharge is throttled through grooves 52 in the upper spool edge of the plunger 30.

A portion of the motor discharge fluid also passes through the orifice 74 and check valve 70 connecting ports 115 and 116 which are in adjacency to and associated with valve 20. As the rammer motor continues to rotate, valve 19 continues to move downward to completely block off all passage of oil from line 108 through the intermediate porting passage at 112 and 122 thereof. Fluid can then reach the inlet side of the motor only by passing from line 108 through port 123 at the intermediate inlet passage of the upper spool section to the upper port 132 associated therewith of valve 20, through the upper ports at 131 of valve 18, and around the check valve seat 73 for the speed control adjustment 67.

As the chain reaches its fully retracted position, the latch end of the cam follower 33 is over the latching cam segment 87 and valve 20 is caused to snap down to its extreme lower position. This action cuts off porting through the upper section at ports 132 and 128 of valve 20, and cuts all flow to the inlet side of the motor and causes the rammer to stop. Return of valve 20 to the lower position thereof also opens the flow passages of port 130 of this valve to the drain connection 142 at the center of the valve spool 30. This releases the pressure on the differential areas at the upper ends of valves 17 and 21. Valve 21 is then free to be returned by spring force to its upper position. Valve 17, being arranged in a detent manner and having no spring beneath it, remains in its lower position until solenoid 13 is energized at the start of the next ramming operation.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In combination with a sprocket driven chain rammer and drive assembly for a rapid fire large bore gun, a reversible rammer motor adapted for the application of ramming and retraction drive energy to said rammer, a closed circuit hydraulic system including an external hydraulic cylinder for initiation of breech block closing, a hydraulic valve block comprising a plurality of hydraulic valve elements including directional control valve elements, and function control means including a plurality of valve elements and pilot valves for initiating programming the cycle of operation for said chain rammer motor, a plurality of cams and cam follower means operatively connected to the output of said hydraulic motor for control of the hydraulic valve elements of the block in response to positional changes of the chain rammer in the path of travel thereof, an electrical control means on said valve block for actuation of a first one of the pilot valves for initial positioning of the directional control valve elements of the valve block, means in said valve block for initiating action of said external hydraulic cylinder in predetermined timed relationship with the starting of retraction movement of said chain rammer and a means in said valve block to prevent actuation flow of hydraulic fluid to said external hydraulic cylinder until completion of a predetermined retraction travel of said chain rammer, whereby a breechblock actuation may be initially controlled by said external hydraulic cylinder and wherein the breechblock is thereby prevented from rising until after the provision of sufficient clearance of the chain rammer with respect to the breechblock.

2. A rammer drive assembly for a major caliber turret gun comprising a chain drive sprocket, a sprocket driven chain rammer, a drive motor therefor for coupling to said sprocket which is interposed between the chain rammer and said motor, a valve block control means comprising a plurality of pilot valves, a motor directional control valve and a plurality of function control valve elements means for providing electrically controlled actuation and hydraulic control of the speed and direction of movement of the rammer motor, cam timing means mechanically interposed between the motor output and the directional control valve elements in the valve block, said electrical actuation and control means comprising a plurality of electrical solenoids disposed in operative relationship with a pair of said pilot valves of said valve block, an electrical interlock circuit means including a source of power and a plurality of external switches and switch actuators disposed along the path of travel of said rammer for actuation thereby whereby one of said solenoids is positionable in response to electric current flow to initiate solenoid movement of a first of said pilot valves to position a first one of said function control valve elements for fluid flow therethrough from a hydraulic pressure source external thereof and additionally to permit fluid flow to provide unlatching action of a second function control valve element of the valve block for mechanical actuation of the motor direction control valve, and a third function valve element in said valve block which is operable to permit fluid flow for motor starting and positionable in response to pilot valve action to provide creep speed drive of the ram chain to a position corresponding to contactual relationship with the ammunition to be rammed, said timing means having a cam element which is actuatable in response to said movement of the chain rammer to initiate positioning of said third function valve element together with said motor direction control valve for full speed ram actuation.

3. In combination, with an automatic rammer drive system, a rapid fire large bore gun, a reversible hydraulic rammer motor, a rammer control valve block comprising a plurality of multiple port spool valve assemblies, one pair of said valve assemblies being disposed for alternating inlet and outlet functioning for direction reversal of said hydraulic rammer motor, a first and second pilot valve in said block, an intermediate multiple port valve, a solenoid actuator operatively connected to said first pilot valve, a plurality of solenoid units operatively connected to impart actuation and return control respectively over said second pilot valve, porting means on said second pilot valve, means on and associated with said second pilot valve for actuation of said intermediate valve, a second porting means on said pilot valve capable of providing actuation of said inlet connected valve assembly, a timing means connected to the mechanical output of said motor, porting means on said intermediate valve capable of operating an actuation plunger for control of the timing means for said valve block, a plurality of adjustable flow restriction check valves disposed respectively in the inlet passage to said motor inlet valve assembly and in a return passage from said motor outlet connected valve assembly pressure source inlet means to said valve block and a return discharge outlet therefrom, a porting passage in communication with said first pilot valve for flow to an additional outlet adaptable for connection to and control over an external hydraulic actuator, means on said inlet connected valve assembly and means on said outlet valve for mechanical coupling with said timing means, a valve plunger means in fluid communication with said first pilot valve for actuation of said mechanical coupling means to position said outlet valve independently of said timing means, first, second, and third electrical solenoids on said valve block, the first of said solenoids being operatively connected for actuation of said first pilot valve in a downward direction, the second of said solenoids being disposed for actuation of said first pilot valve in an upward direction, and said third solenoid being adapted for actuation of said second pilot valve in a downward direction, an electrical circuit including means for connecting said solenoids to programming and interlock switches in a manner to provide actuation of said first solenoid for initial operation of the rammer motor, said third solenoid being adapted for electrical actuation to move the second pilot valve in a manner permitting flow through porting passages thereof for control initiation of at said outlet for the external hydraulic actuator for breechblock closure for the gun, and said second solenoid being adapted to reposition the first pilot valve at the end of cycle condition of the rammer drive system.

4. A rammer drive unit assembly adapted for mounting on a major caliber turret gun slide of a character including an automatic breech system and a transfer tray system for ammunition handling, said drive unit assembly being connected for driving engagement of a drive sprocket of a chain type rammer from the output shaft thereof, said drive unit assembly comprising a reversible gear type hydraulic motor, a valve block assembly in fluid communication with the inlet and outlet ports of the said motor, and a timing mechanism program control connected in mechanical drive relationship with the output shaft of said motor, said valve block assembly including a plurality of electrically actuated solenoid means adapted for controlled initiation of rammer drive movement, a plurality of pilot valves in said block, a motor inlet controlling valve, a spring loaded motor outlet controlling valve having flow throttling means therein, a hydraulically actuated cam release valve actuating plunger, an intermediate valve in said valve block interposed in fluid communicative relationship with the motor inlet control valve and selectively one or more of said pilot valves for control actuation thereby, said timing mechanism comprising a plurality of cam segments connected to be driven by the motor one of said cam segments having a follower disposed for engaged movement with the cam thereof and releasable therefrom by actuation of said cam release-valve actuating release plunger for positioning of said motor outlet valve, a second cam follower disposed for actuation of the motor inlet control valve in response to rotation of the cam which provides control therefor, said system being operatively connected in a manner whereby the operation of the motor in a forward ram direction is initiated in response to positioning of transfer trays of the gun system and by electrical control therefrom of the first of said solenoids whereby the first recited pilot valve is actuated thereby to position the motor inlet controlling valve for flow therethrough and to a second fluid communicative path thereof to provide unlatching actuation of said release plunger whereby fluid flow through the inlet and intermediate and outlet valves initiates motor drive and results in drive movement of the cam of the timing mechanism for positional movement of the outlet valve to a fully open position therefor, the contour of the outlet valve cam surface being such as to permit closure of the outlet valve under spring loaded action thereof to throttle to a stop the fluid flow providing ram drive for the motor, the second said outlet valve having ports thereon in fluid communicational relationship with differential pressures area of said first pilot valve and said second pilot valve when in the downward position thereof whereby said valves are maintained in an interlock positional relationship against inadvertent solenoid operation thereof, a third connection from said valve block arranged to provide hydraulic actuation of an external hydraulic plunger unit capable of initiating control action over breechblock movement, flow to said external source being contemporaneous with said downward movement of the outlet valve with the completion of ramming action, said second solenoid being electrically connected in said system for actuation at the end of ramming action and a third solenoid for pilot valve operation in a manner to permit reverse flow through the port of the inlet valve whereby fluid flow through the motor is reversed and the outlet valve which previously provided inlet flow to the motor is connected as a drain outlet.

5. The combination in a rammer drive unit for mechanical actuation of a sprocket driven chain type linear rammer for a major caliber gun slide system of a character incorporating an automatic hydraulic breech system, of hydraulic motor means, mechanical timing means connected thereto, and hydraulic valve control means, said timing means being mechanically interposed between said hydraulic motor and the hydraulic control means, valve means providing initiation of motor operation to creep speed movement of the rammer drive, means for changing control thereafter to provide full ram speed at a position corresponding to rammer contact with the ammunition, means providing deceleration to stop at a drive condition corresponding to fully rammed position of the ammunition, valve means providing ram reversal and prevention of breechblock rising action until after completion of a predetermined retraction travel, means responsive to motor retraction drive corresponding to ram withdrawal past a breech way of the slide to initiate closure action thereof by the breechblock, electrical valve actuation and control means for providing accelerating ram motor drive during retraction, means providing ram deceleration to stop at end of the retract stroke, and means rendering the system inactive at end of stroke condition of said rammer and providing a re-positioning relationship for subsequent actuation to initiate a succeeding operational cycle, electrical valve and actuation control means comprising a plurality of electrically controlled solenoids, one of which functions upon actuation thereof to provide initiation to creep speed movement in addition to the function of electrical valve actuation for accelerating said motor during retraction.

References Cited in the file of this patent
UNITED STATES PATENTS

| | | |
|---|---|---|
| 889,321 | Meigs et al. | June 2, 1908 |
| 2,379,180 | Pohl | June 26, 1945 |
| 2,410,116 | Vickers | Oct. 29, 1946 |